(12) United States Patent
Sittler (10) Patent No.: US 12,438,563 B2
(45) Date of Patent: Oct. 7, 2025

(54) COMMUNICATIONS DEVICE

(71) Applicant: STMicroelectronics (Grand Ouest) SAS, Le Mans (FR)

(72) Inventor: Francois Sittler, Thorigne-Fouillard (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 380 days.

(21) Appl. No.: 17/962,961

(22) Filed: Oct. 10, 2022

(65) Prior Publication Data

US 2023/0170922 A1    Jun. 1, 2023

(30) Foreign Application Priority Data

Nov. 26, 2021   (FR) ..................... 2112599

(51) Int. Cl.
*H04B 1/00*   (2006.01)

(52) U.S. Cl.
CPC ......... *H04B 1/0067* (2013.01); *H04B 1/0064* (2013.01)

(58) Field of Classification Search
None
See application file for complete search history.

(56) References Cited

U.S. PATENT DOCUMENTS

| | | | |
|---|---|---|---|
| 2014/0227982 A1* | 8/2014 | Granger-Jones | H04B 1/006 455/77 |
| 2020/0343866 A1* | 10/2020 | Deguchi | H04B 1/18 |
| 2021/0242889 A1 | 8/2021 | Obiya et al. | |
| 2021/0297109 A1 | 9/2021 | Ono et al. | |
| 2021/0351812 A1 | 11/2021 | Chen et al. | |

FOREIGN PATENT DOCUMENTS

CN    2340126 Y    9/1999

* cited by examiner

*Primary Examiner* — Frantz Bataille
(74) *Attorney, Agent, or Firm* — Slater Matsil, LLP (57) ABSTRACT

The present description concerns a communication device including a first communication circuit coupled to a first antenna port of the communication device; a switch having first, second and third terminals, the first terminal being coupled to a second antenna port of the communication device, the switch being configured to switch between a first state in which the first terminal is coupled t the second terminal and a second state in which the first terminal is coupled to the third terminal; a third port coupled to the second terminal of the switch; and a second communication circuit coupled to the third terminal.

20 Claims, 4 Drawing Sheets

COMMUNICATIONS DEVICE

CROSS-REFERENCE TO RELATED APPLICATIONS

This application claims priority to French Application No. 2112599, filed on Nov. 26, 2021, which application is hereby incorporated by reference herein in its entirety.

TECHNICAL FIELD

The present disclosure generally relates to communication devices, and in particular embodiments, to wireless communications devices and systems.

BACKGROUND

Communication devices and systems, particularly those dedicated to wireless applications, may use a plurality of communication standards in parallel.

The simultaneous use of current communications devices and systems is expensive or does not enable to obtain an optimal performance.

SUMMARY

To use a plurality of communication standards in parallel, it may be envisaged for the communications devices and systems to include one antenna per communication standard that they implement. This configuration may have advantages in terms of performance.

It is also possible for communications devices and systems to include a single antenna common to the different communications standards they implement. This configuration enables to spare the cost of one or a plurality of antennas.

These solutions generally require selecting one or the other of the configurations, which limits the flexibility of using communications devices and systems.

There is a need for a communications device and system adapted to enable using a single or a plurality of antennas according to the configuration desired by the user while optimizing production costs and user-friendliness. An embodiment overcomes all or part of the disadvantages of known communications devices and systems.

An embodiment provides a communications device including: a first communications circuit coupled to a first antenna port of the communications device; a switch having first, second and third terminals, the first terminal being coupled to a second antenna port of the communications device, the switch being configured to switch between a first state in which the first terminal is coupled to the second terminal and a second state in which the first terminal is coupled to the third terminal; a third port coupled to the second terminal of the switch; and a second communications circuit coupled to the third terminal.

According to an embodiment, the second communications circuit is coupled to the third terminal via a communications interface circuit configured to generate a transmission signal for transmission via the second antenna port.

According to an embodiment, the switch further includes a fourth terminal, the switch is configured to switch between the first state, the second state, and a third state in which the first terminal is coupled to the fourth terminal; the second communications circuit being coupled to the fourth terminal via a communications interface circuit configured to receive a signal received via the second port of antenna.

According to an embodiment, wherein the first communications circuit is configured to process location information received via the first antenna port.

According to an embodiment, the second communications circuit is configured to process cellular-type information received via the second antenna port.

An embodiment provides a communications system including: such a communications device, a link coupling the first antenna port and the third port; and a first antenna coupled to the second antenna port.

According to an embodiment, the antenna is configured to receive or transmit signals compatible with the first and second communications circuits.

An embodiment provides a communications system including such a communications device, wherein the first antenna port and the third port are not linked; and wherein the second antenna port is coupled to a first antenna and the first antenna port is coupled to a second antenna.

An embodiment provides a method of configuring an antenna of such a communications system, the method including placing a link between the first antenna port and the third port.

BRIEF DESCRIPTION OF THE DRAWINGS

Other advantages and features of the invention will become apparent upon examining the detailed description of non-limiting embodiments and implementations of the invention, and from the accompanying drawings in which.

DETAILED DESCRIPTION OF ILLUSTRATIVE EMBODIMENTS

Like features have been designated by like references in the various figures. In particular, the common structural or functional features among the various embodiments may have the same references and dispose of identical structural, dimensional, and material properties.

For clarity, only those steps and elements which are useful to the understanding of the described embodiments have been shown and are detailed. In particular, the different functions of the electronic circuits are shown in the form of blocks and do not detail the transistors, memories, and other elements enabling to implement functions. The functions shown in the form of blocks may be implemented in a standard fashion according to the knowledge of those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

Figure 1:
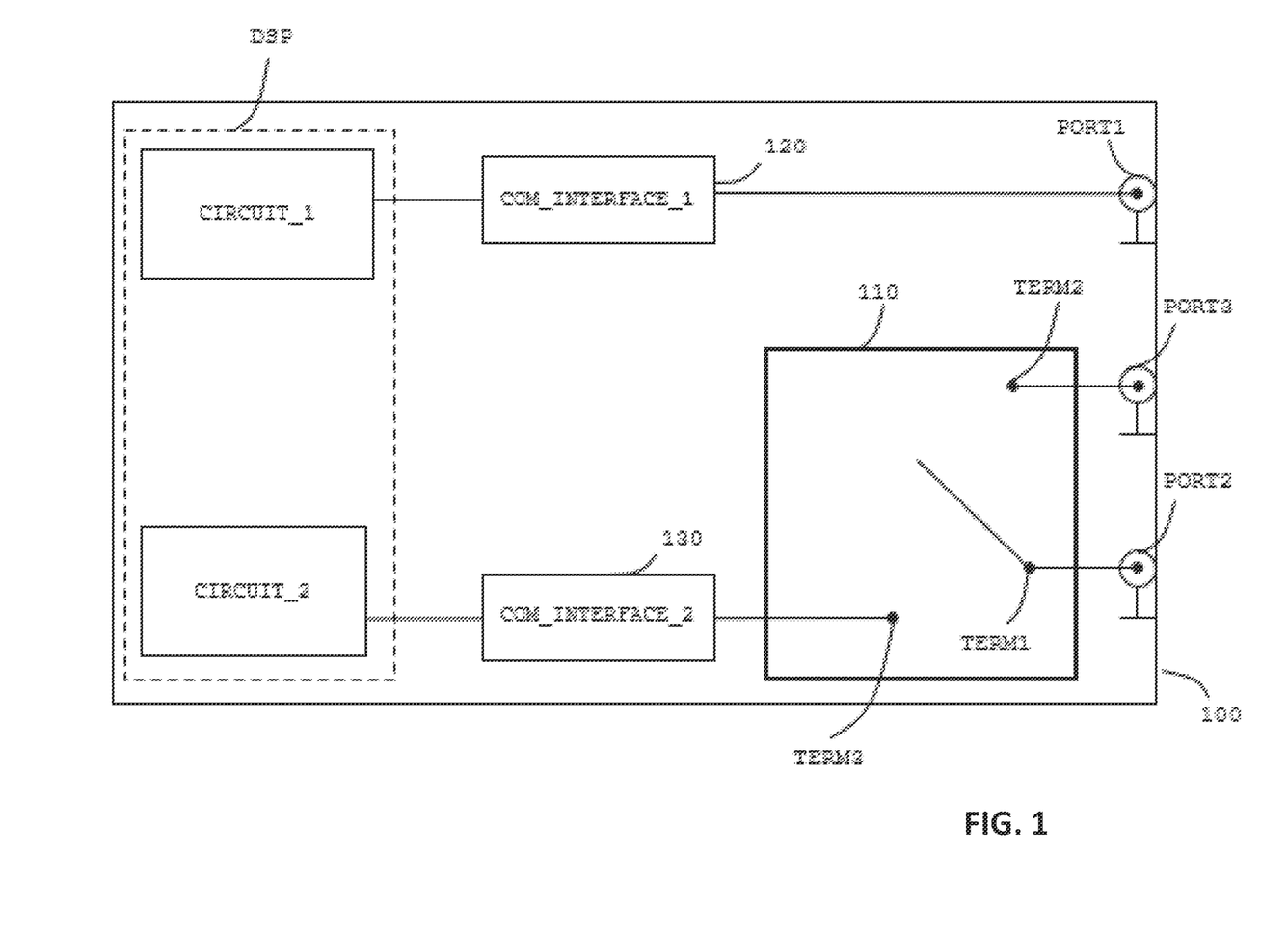
FIG. 1 is a simplified view of a communications device according to an embodiment of the present disclosure.

FIG. 1 is a simplified view of a communications device 100 according to an embodiment.

Communications device 100 includes a first antenna port PORT1, a second antenna port PORT2, and a third port PORT3. First and second antenna ports PORT1, PORT2 are, for example, configured to be able to be coupled to an antenna, for example, via an element transporting radio frequency signals such as a waveguide or a radio frequency wave conductive track formed in a printed circuit board (PCB). Third port PORT3 is, for example, configured to be connected to an element transporting radio frequency signals such as a waveguide or a radio frequency wave conductive track formed in a printed circuit board.

Communications device 100 also includes a switch 110. The switch 110 of the example of FIG. 1 includes first, second, and third terminals TERM1, TERM2, TERM3. Second antenna port PORT2 is coupled to first terminal TERM1. Third port PORT3 is coupled to second terminal TERM2.

Communications device 100 further includes a first communications circuit CIRCUIT_1 and a second communications circuit CIRCUIT_2. First communications circuit CIRCUIT_1 is coupled to first antenna port PORT1. Second communications circuit CIRCUIT_2 is coupled to the third terminal TERM3 of the switch. According to an example, circuit CIRCUIT_1 includes components enabling to process signals of a first type or of a second type transiting via port PORT1. According to an example, circuit CIRCUIT_2 includes components enabling to process signals of the first type or of the second type. The signals of the first type are, for example, signals related to a location such as signals of GPS, GNSS, or GALILEO type. The signals of the second type are, for example, of cellular type such as according to the GPRS, EDGE, UMTS, HSDPA, DC-HSPA, or LTE protocols. The signals of the first and second types are, for example, analog or digital. According to an embodiment, the signals of the first or second type are formed of input signals, originating from the outside of communications device 100 and intended for communications circuits CIRCUIT_1 or CIRCUIT_2. According to an embodiment, the signals of the first or second type are, for example, formed of output signals, intended to be transmitted to the outside of communications device 100, for example, via an antenna. According to an embodiment, the signals of the first type are similar to those of the second type. According to an embodiment, communications circuits CIRCUIT_1 and CIRCUIT_2 form part of the same digital signal processor (DSP).

According to the example of FIG. 1, a communications interface circuit COM_INTERFACE_1, 120 is arranged between first communications circuit CIRCUIT_1 and first antenna port PORT1. Communications interface circuit COM_INTERFACE_1, 120 is, for example, configured to process the input or output signals so that the input signals are usable by first communications circuit CIRCUIT_1 or so that the output signals are adapted to being transmitted by an antenna coupled to first port PORT1. Communications interface circuit 120 may, for example, include an impedance matching circuit, or a frequency filter or an amplifier or a low-noise amplifier. According to an embodiment, not illustrated, communications interface circuit COM_INTERFACE_1, 120 is integrated to communications circuit CIRCUIT_1.

Another communications interface circuit COM_INTERFACE_2, 130, having functions that may be similar to communications interface circuit COM_INTERFACE_1, 120, may also be arranged between second communications circuit CIRCUIT_2 and second antenna port PORT2. According to an example, communications interface circuit COM_INTERFACE_2, 130 is arranged between second communications circuit CIRCUIT_2 and the third terminal TERM3 of switch 110. According to an embodiment, not illustrated, communications interface circuit COM_INTERFACE_2, 130 is integrated into communications circuit CIRCUIT_2.

Switch 110 is, for example, driven by a microcontroller (not shown in FIG. 1). In particular, switch 110 is configured to be able to alternately switch between a first state where first terminal TERM1 is coupled to second terminal TERM2 and a second state where the first terminal TERM1 is coupled to third terminal TERM3.

When switch 110 is in the second state, the signals may, for example, transit between second antenna port PORT2 and second communications circuit CIRCUIT_2 and the other way.

When switch 110 is in the first state (TERM1 coupled to TERM2) and a link, for example, removable (not shown in FIG. 1), is implemented between third port PORT3 and first antenna port PORT1, signals may, for example, transit between second antenna port PORT2 and first communications circuit CIRCUIT_1 and the other way. According to the state of switch 110, it is then possible to alternately couple second antenna port PORT2 to the first and second communications circuits CIRCUIT_1 and CIRCUIT_2. In this configuration with a link between first antenna port PORT1 and third port PORT3, if an antenna is coupled to second communications port PORT2, it is then possible for the first and the second communications circuits CIRCUIT_1, CIRCUIT_2 to alternately receive or transmit, according to the state of switch 110, signals from or to the antenna. This configuration enables to limit costs.

According to an example, an antenna (not shown in FIG. 1) may be coupled to first antenna port PORT1 and another antenna (not shown in FIG. 1) may be coupled to second antenna port PORT2. The antenna coupled to first antenna port PORT1 is, for example, compatible with the first type of signal and the antenna coupled to second antenna port PORT2 is, for example, compatible with the second type of signal, although the inverse is possible. In this configuration, no link is present between first antenna port PORT1 and third port PORT3. Switch 110 is then driven to only be in its second state. This example allows an increased performance since the switching of an antenna to two communications circuits CIRCUIT_1 and CIRCUIT_2 is avoided and, further, the antennas used may each be optimized for signals of different types which will be processed differently by the first and the second communications circuit CIRCUIT_1 and CIRCUIT_2.

There results from the use of switch 110 associated with 3 different ports PORT1, PORT2, PORT3 an increased flexibility of use since a plurality of configurations (with 1 or 2 antennas, for example) may be implemented from a single communications device 100. This further enables to limit production costs.

Figure 2:
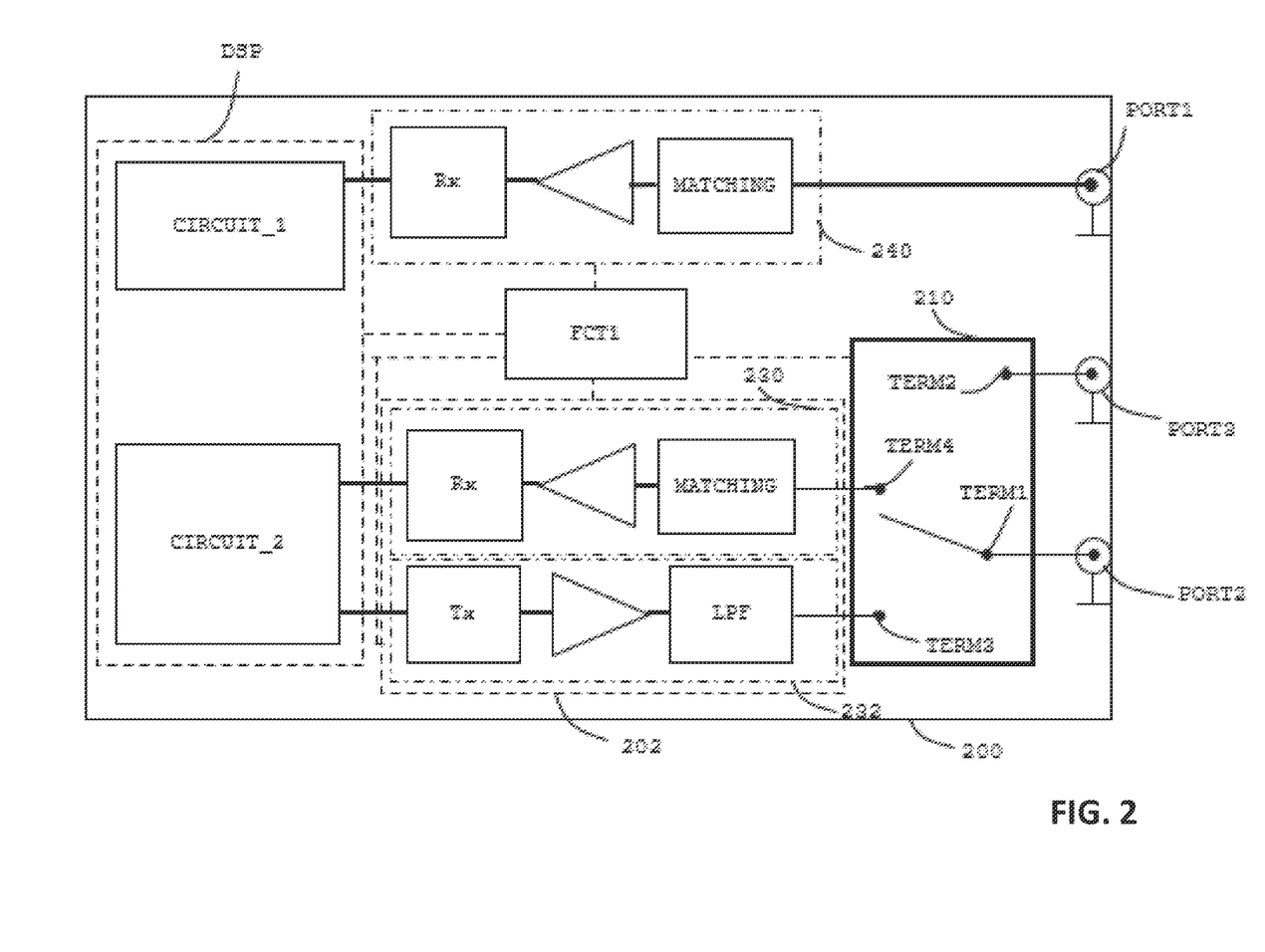
FIG. 2 is a simplified view of a communications device according to an embodiment of the present disclosure.

FIG. 2 shows a simplified view of an embodiment of a communications device 200. Communications device 200 may in particular implement a time division multiple access mode (TDMA).

Communications device 200 has certain similarities with the device 100 of FIG. 1. In particular, communications device 200 includes the first and the second communications circuits CIRCUIT_1, CIRCUIT_2 as well as the first and second antenna ports PORT1 and PORT2, and third port PORT3.

Switching device 200 includes a switch 210 instead of switch 110, switch 210 having an additional terminal TERM4 with respect to switch 110. Switch 210 is configured to switch between a first state, a second state, and a third state. The first and second state are respectively similar to the first and second state of switch 110. In the third state, first terminal TERM1 is coupled to fourth terminal TERM4.

Communications device 200 further includes a communications interface circuit 202 formed of a first signal reception circuit 230 and of a second signal sending circuit 232. Second communications circuit CIRCUIT_2 is coupled to fourth terminal TERM4 via first circuit 230. Second communications circuit CIRCUIT_2 is further coupled to third terminal TERM3 via second circuit 232.

First circuit 230, for example, includes an impedance matching circuit (MATCHING) configured to optimize the electric power transfer and the transmission of an input signal originating, for example, from an antenna coupled to second antenna port PORT2 with switch 210 set to the third state. First circuit 230, for example, includes an amplifier of the input signal which is arranged at the output of the impedance matching circuit. First circuit 230 may also include a reception module (Rx) having the function of decoding and conditioning the signal so that it can be interpreted by second communications circuit CIRCUIT_2.

Second circuit 232, for example, includes a transmission module Tx having the function of encoding and transforming the output signal generated by second communications circuit CIRCUIT_2. After the amplification, this signal is, for example, filtered by a harmonics filter, for example, a low pass filter (LPF), or processed by an impedance matching circuit to optimize the power transfer and the transmission of the output signal to, for example, an antenna coupled to second antenna port PORT2 with switch 210 set to the second state.

According to the example of FIG. 2, first communications circuit CIRCUIT_1 is coupled to first antenna port PORT1 via a communications interface circuit 240. According to the example of FIG. 2, communications interface circuit 240 is formed of a signal reception circuit. Communications interface circuit 240, for example, includes functions similar to those of first circuit 230. The impedance matching parameters may be adjusted to the characteristics of the possible antenna coupled to first antenna port PORT1 to optimize electric power transfer and the signal transmission.

According to an example, not illustrated, communications interface circuit 240 may also include a signal sending circuit having functions similar to second circuit 232. First communications circuit CIRCUIT_1 may then be coupled to a secondary switch (not illustrated) via the signal sending circuit. If the secondary switch is implemented, it is possible to drive it so that it alternates between its two states to send or to receive signals to or from second antenna PORT2. In particular, the secondary switch may occupy a state where the signal reception circuit of communications interface circuit 240 is coupled to first antenna port PORT1. The secondary switch may further occupy a state where the signal sending circuit of communications interface circuit 240 is coupled to first antenna port PORT1.

Communications device 200, for example, includes a driver circuit FCT1 which is, for example, a microcontroller. Driver circuit FCT1 controls at least switch 210 and possibly the communications circuits or the different communications interface circuits.

According to an example where communications circuits CIRCUIT_1 and CIRCUIT_2 form part of the same digital signal processor DSP, driver circuit FCT1 may be integrated into the digital signal processor. In this example, digital signal processor DSP may control, via driver circuit FCT1, switch 210 so that it privileges the reception or the sending of signals processed by one of circuits CIRCUIT_1, CIRCUIT_2, for example, if first communications circuit CIRCUIT_1 is configured to process positioning signals and if second communications circuit CIRCUIT_2 is configured to process signals of cellular type, digital signal processor DSP may control, via driver circuit FCT1, switch 210 so that it privileges the reception or the sending of signals of cellular type.

According to an example, when switch 210 is in the first state and a link (not illustrated in FIG. 2) is implemented to couple first antenna port PORT1 and third port PORT3, it is possible for an input signal at the level of second antenna port PORT2 to be sent towards first communications circuit CIRCUIT_1.

Switch 210 is, for example, driven to take the second state to send output signals of second communications circuit CIRCUIT_2 to second antenna port PORT2.

When switch 210 is driven to take the third state, it is possible for an input signal at the level of second antenna port PORT2 to be processed by second communications circuit CIRCUIT_2.

According to an example, switch 210 is of 3-branch type, for example, of SP3T type.

Figure 3:
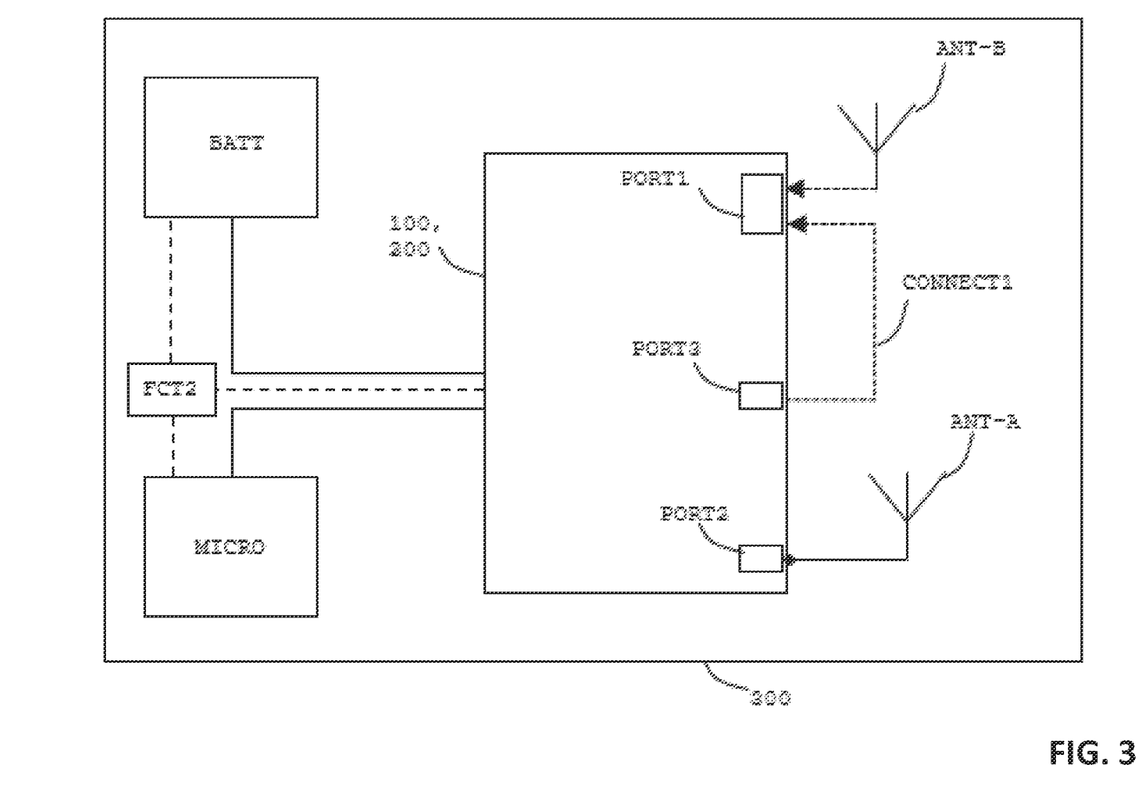
FIG. 3 is a simplified view of a communications system according to an embodiment of the present disclosure.

Communications device 210 is thus compatible with configurations with a single antenna and with two antennas when it is implemented in a communications system as described in the example of FIG. 3.

FIG. 3 is a simplified view of a communications system 300 according to an embodiment of the present description.

Communications system 300 includes either communications device 100 or communications device 200 such as described in the previous paragraphs.

According to the embodiment of FIG. 3, communications system 300 further includes a power supply element BATT that may, for example, be a battery, an accumulator, a supercapacitor, or also a coil chargeable by induction. Power supply element BATT is configured to power the different elements of communications system 300.

According to the example of FIG. 3, communications system 300, for example, includes a microprocessor MICRO to drive, in particular, communications device 100, 200.

Communications system 300 may further include a functional center FCT2 configured to implement the functions necessary to the basic operation of the communications system, such as, for example, the management of communications device 100, 200, of the memories (not shown), the power supply management or also the management of the data buses (not shown) which connect the different elements of communications system 300.

In a single-antenna configuration, communications system 300 includes a first antenna ANT-A coupled to second antenna PORT2 and a link CONNECT1 coupling the third port and first antenna port PORT1. Link CONNECT1 is, for example, an element configured to transport radio frequency signals, such as a waveguide or a radio frequency wave conductive track formed in a printed circuit board. Link CONNECT1 may, for example, be formed by a fixed connection, for example, by a printed track on a PCB having communications device 100, 200 arranged thereon. In another example, link CONNECT1 is removable to easily switch from a configuration compatible with one antenna to a configuration compatible with two antennas. In the configuration including a link, switch 110, 210 is driven to, for example, switch between the first and second states, and in the case of switch 210, between the first, second, and third states. First antenna ANT-A may, for example, be configured to receive, transmit, or emit signals compatible with first and second communications circuits CIRCUIT_1, CIRCUIT_2. This configuration enables to optimize costs.

In a two-antenna configuration, communications system 300 further includes a second antenna ANT-B coupled to first antenna port PORT1. In this two-antenna configuration, link CONNECT1 is not present. Switch 110 is then driven to remain in the second state, or in the case of switch 210, in the third state, or also to switch between the second and third states.

Such a communications system 300 allows use with a single antenna or with two antennas without requiring additional switches external to communications device 100, 200.

Figure 4:
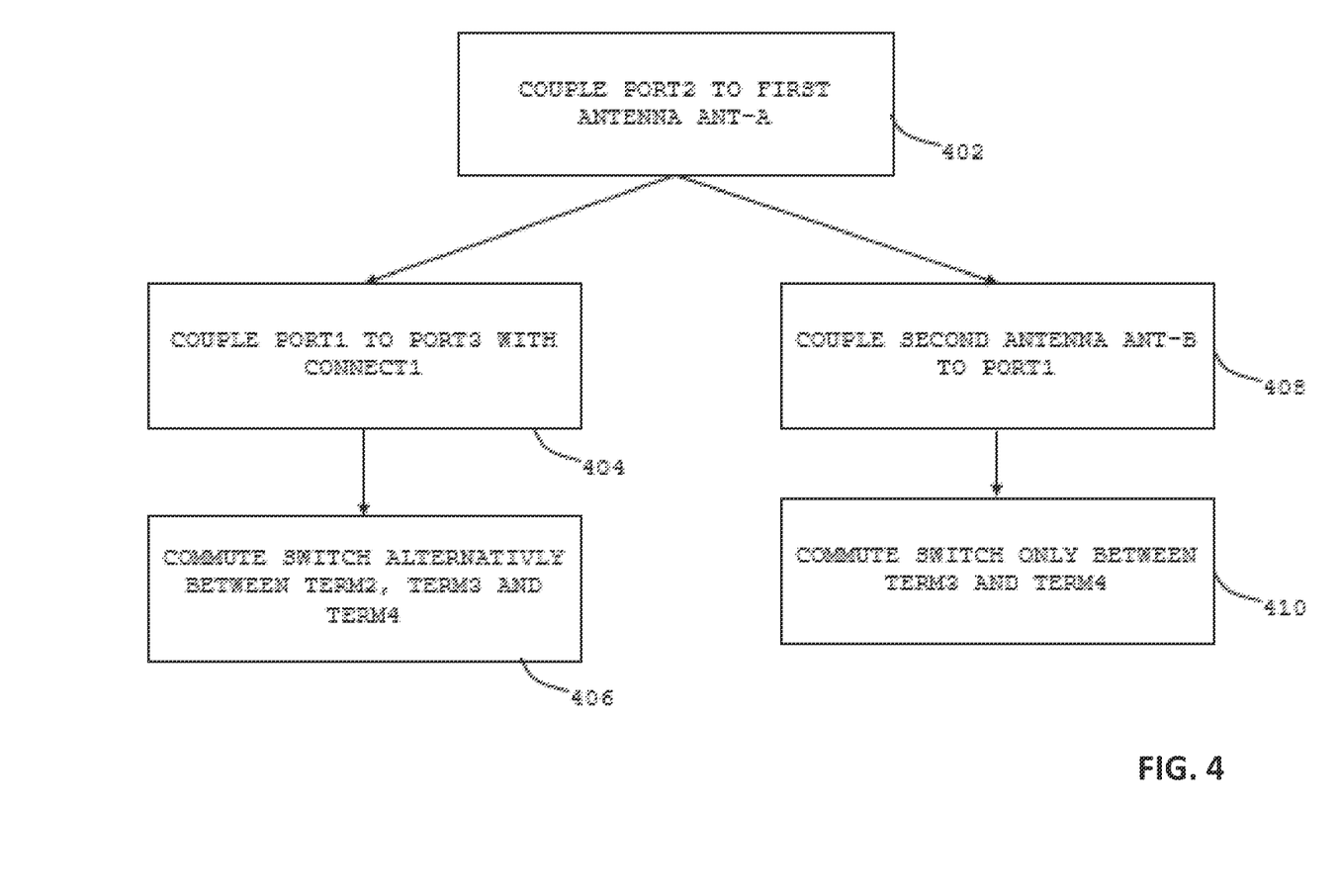
FIG. 4 is a flowchart of a method of configuring the communications system of FIG. 3 according to an embodiment of the present disclosure.

FIG. 4 is a flowchart of a method of configuring the communications system of FIG. 3 according to an embodiment of the present description.

In a first step (COUPLE PORT2 TO FIRST ANTENNA ANT-A, 402), first antenna ANT-A is connected to second antenna port PORT2.

In the single-antenna configuration, in an additional step (COUPLE PORT1 TO PORT3 WITH CONNECT1, 404), link CONNECT1 is installed to couple first antenna port PORT1 and third port PORT3. Afterwards, during the operation of the communications system, switch 110, 210 is driven (COMMUTE SWITCH ALTERNATIVELY BETWEEN TERM2, TERM3 AND TERM4, 406) to alternate, in the case of switch 110, between the first and the second state and in the case of switch 210 between the first and the second state or between the first and the third state or between the second state and the third state.

In the two-antenna configuration, the method includes a step (COUPLE SECOND ANTENNA ANT-B TO PORT1, 408) where second antenna ANT-B is connected to first antenna port PORT1. This step may optionally include previously removing link CONNECT1 between first antenna port PORT1 and third port PORT3. In this two-antenna configuration, switch 110, 210 is driven (COMMUTE SWITCH ONLY BETWEEN TERM3 AND TERM4, 410) to remain in the second state, in the case of switch 110, or in the case of switch 210, in the second state or in the third state or also to alternate between the second and the third state.

Such a method enables to use communications system 300 with a single antenna or with two antennas, which allows a great flexibility.

Various embodiments and variants have been described. Those skilled in the art will understand that certain features of these various embodiments and variants may be combined, and other variants will occur to those skilled in the art. It is possible to use more antennas, which would be coupled to other antenna ports of the communications device. Those skilled in the art can deduce from the present disclosure the number of terminals necessary for the switch. It is also possible to implement a plurality of links of the same type as link CONNECT1 to couple a plurality of ports if the number of communications circuits is greater than two.

Finally, the practical implementation of the described embodiments and variations is within the abilities of those skilled in the art based on the functional indications given hereabove. In particular, the processing of the signals of the first and second type by the communications interface circuits is within the abilities of those skilled in the art.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A communication device, comprising:
a first antenna port, a second antenna port, and a third antenna port;
a first communication circuit coupled to the first antenna port;
a switch comprising a first terminal, a second terminal, and a third terminal, the first terminal coupled to the second antenna port, the second terminal coupled to the third antenna port, the switch configured to switch between a first state in which the first terminal is coupled to the second terminal and a second state in which the first terminal is coupled to the third terminal;
a second communication circuit coupled to the third terminal; and
a linking transmission line selectively couplable between the first antenna port and the third antenna port,
wherein, in a first configuration, the linking transmission line is coupled between the first antenna port and the third antenna port to enable a single-antenna operation mode where the first communication circuit and the second communication circuit share a first antenna coupled to the first antenna port, and
wherein, in a second configuration, the linking transmission line is uncoupled from at least one of the first antenna port or the third antenna port to enable a dual-antenna operation mode where the first communication circuit communicates via the first antenna coupled to the first antenna port and the second communication circuit communicates via a second antenna coupled to the second antenna port.

2. The communication device of claim 1, wherein the second communication circuit is coupled to the third terminal via a communication interface circuit configured to generate a transmission signal for transmission via the second antenna port.

3. The communication device of claim 1, wherein the switch further comprises a fourth terminal coupled to the first terminal, the switch configured to switch between the first state, the second state, and a third state, the second communication circuit coupled to the fourth terminal via a communication interface configured to receive a signal received via the second antenna port.

4. The communication device of claim 1, wherein the first communication circuit is configured to process location information received via the first antenna port.

5. The communication device of claim 1, wherein the second communication circuit is configured to process cellular-type information received via the second antenna port.

6. The communication device of claim 1,
wherein the linking transmission line is removable to facilitate switching between the first configuration and the second configuration, and
wherein the switch is driven to switch between the first state and the second state when the linking transmission line is coupled between the first antenna port and the third antenna port in the first configuration.

7. A system, comprising:
a first antenna; and
a communication circuit comprising:
a first antenna port,
a second antenna port coupled to the first antenna,
a third antenna port,
a first communication circuit coupled to the first antenna port,
a switch comprising a first terminal, a second terminal, and a third terminal, the first terminal coupled to the second antenna port, the second terminal coupled to the third antenna port, the switch configured to switch between a first state in which the first terminal is coupled to the second terminal and a second state in which the first terminal is coupled to the third terminal,
a second communication circuit coupled to the third terminal; and
a linking transmission line selectively couplable between the first antenna port and the third antenna port,
wherein, in a first configuration, the linking transmission line is coupled between the first antenna port and the third antenna port to enable a single-antenna operation mode where the first communication circuit and the second communication circuit share the first antenna coupled to the first antenna port, and
wherein, in a second configuration, the linking transmission line is uncoupled from at least one of the first antenna port or the third antenna port to enable a dual-antenna operation mode where the first communication circuit communicates via the first antenna coupled to the first antenna port and the second communication circuit communicates via a second antenna coupled to the second antenna port.

8. The system of claim 7, wherein the first antenna is configured to receive, transmit, or receive and transmit, signals compatible with the first communication circuit and the second communication circuit.

9. The system of claim 7, wherein the second communication circuit is coupled to the third terminal via a communication interface circuit configured to generate a transmission signal for transmission via the second antenna port.

10. The system of claim 7, wherein the switch further comprises a fourth terminal coupled to the first terminal, the switch configured to switch between the first state, the second state, and a third state, the second communication circuit coupled to the fourth terminal via a communication interface configured to receive a signal received via the second antenna port.

11. The system of claim 7, wherein the first communication circuit is configured to process location information received via the first antenna port.

12. The system of claim 7, wherein the second communication circuit is configured to process cellular-type information received via the second antenna port.

13. A method, comprising:
switching, a switch of a communication device, between a first state and a second state, the communication device having a first antenna port, a second antenna port, and a third antenna port, the communication device having a first communication circuit coupled to the first antenna port, the switch having a first terminal, a second terminal, and a third terminal, the first terminal coupled to the second antenna port, the second terminal coupled to the third antenna port, the communication device having a second communication circuit coupled to the third terminal, the first terminal coupled to the second terminal in the first state, and the first terminal coupled to the third terminal in the second state; and
selectively coupling a linking transmission line between the first antenna port and the third antenna port,
wherein, in a first configuration, the linking transmission line is coupled between the first antenna port and the third antenna port to enable a single-antenna operation mode where the first communication circuit and the second communication circuit share a single antenna coupled to the first antenna port, and
wherein, in a second configuration, the linking transmission line is uncoupled from at least one of the first antenna port or the third antenna port to enable a dual-antenna operation mode where the first communication circuit communicates via a first antenna coupled to the first antenna port and the second communication circuit communicates via a second antenna coupled to the second antenna port.

14. The method of claim 13, wherein the second communication circuit is coupled to the third terminal via a communication interface circuit, the method further comprising:
generating, using the communication interface circuit, a transmission signal for transmission via the second antenna port.

15. The method of claim 13, wherein the switch further comprises a fourth terminal coupled to the first terminal, the method further comprising:
switching, the switch, between the first state, the second state, and a third state, the second communication circuit coupled to the fourth terminal via a communication interface; and
receiving, by the communication interface, a signal received via the second antenna port.

16. The method of claim 13, further comprising:
receiving, by the first communication circuit, location information from the first antenna port; and
processing the location information, using the first communication circuit.

17. The method of claim 13, further comprising:
receiving, by the second communication circuit, cellular-type information from the second antenna port; and
processing the cellular-type information, using the second communication circuit.

18. The method of claim 13, further comprising:
- in the first configuration, driving the switch to alternate between the first state and the second state to selectively route signals between the single antenna and the first communication circuit or the second communication circuit; and
- in the second configuration, maintaining the switch in the second state to route signals between the second antenna and the second communication circuit while the first communication circuit communicates with the first antenna.

19. The communication device of claim 1, further comprising:
- a directional coupler coupled to the second antenna port; and
- control circuitry configured to:
    - detect a performance characteristic of the first antenna in the first configuration,
    - detect a performance characteristic of the second antenna in the second configuration, and
    - select between the first configuration and the second configuration based on the detected performance characteristics to optimize at least one of transmission efficiency or reception sensitivity.

20. The system of claim 7, wherein the linking transmission line comprises a radio frequency wave conductive track formed in a printed circuit board, and wherein the system is configured to:
- in the first configuration, drive the switch to alternate between the first state and the second state to enable time-division multiplexed access to the first antenna by the first communication circuit and the second communication circuit; and
- in the second configuration, drive the switch to remain in the second state.

* * * * *